United States Patent [19]

Billon et al.

[11] Patent Number: 4,510,042

[45] Date of Patent: Apr. 9, 1985

[54] HEAVY OIL PROCESS WITH HYDROVISBREAKING, HYDRODEMETALLATION AND HYDRODESULFURATION

[75] Inventors: Alain Billon, Orlienas; Yves Jacquin, Sevres; Jean-Pierre Peries, Mornant; Hervé Toulhoat, Le Pecq, all of France

[73] Assignee: Institut Francais du Petrole, Rueil-Malmaison, France

[21] Appl. No.: 567,208

[22] Filed: Dec. 30, 1983

[30] Foreign Application Priority Data

Dec. 30, 1982 [FR] France .................. 82 22210

[51] Int. Cl.³ ............................................ C10G 23/02
[52] U.S. Cl. ........................................ 208/59; 208/89; 208/97; 208/210; 208/216 PP; 208/251 H

[58] Field of Search ............... 208/251 H, 58, 59, 89, 208/97, 216 PP, 210, 211; 502/439

[56] References Cited

U.S. PATENT DOCUMENTS

| | | | |
|---|---|---|---|
| 3,770,617 | 11/1973 | Riley et al. | 208/216 |
| 3,947,347 | 3/1976 | Mitchell | 208/351 |
| 4,212,729 | 7/1980 | Hensley, Jr. et al. | 208/216 |
| 4,225,421 | 9/1980 | Hensley, Jr. et al. | 208/112 |
| 4,395,329 | 7/1983 | Le Page et al. | 502/211 |

Primary Examiner—Delbert E. Gantz
Assistant Examiner—Lance Johnson
Attorney, Agent, or Firm—Millen & White

[57] ABSTRACT

An asphaltene-containing heavy oil or heavy oil fraction is converted to lighter fractions in a process comprising three steps: a hydrovisbreaking, a catalytic hydrodemetallation and catalytic hydrodesulfuration.

14 Claims, 11 Drawing Figures

FIG.6
1mm = 9 nanomètres

HEAVY OIL PROCESS WITH HYDROVISBREAKING, HYDRODEMETALLATION AND HYDRODESULFURATION

BACKGROUND OF THE INVENTION

This invention relates to the treatment of heavy oils or heavy oil fractions of high asphaltene content, in order to convert them to lighter fractions whose transport and treatment by usual refining processes is easier. Oils from coal hydrogenation may also be treated.

More particularly, the invention solves the problem of converting a viscous, non transportable, crude oil of high metals, sulfur and asphaltenes content and comprising more than 50% of constituents having a normal boiling point higher than 520° C., to a stable, easily transportable hydrocarbon product, of low metals, sulfur and asphaltenes contents and having only a reduced content, for example less than 20% by weight, of constituents of normal boiling point higher than 520° C.

The problem solved by the invention has been studied for a long time; the main difficulty to overcome is that of the deactivation of the catalysts by impurities, mainly metal impurities, from the treated charges. Thus, for example, Boscan or Cerro Negro crude oil may contain from 200 to 1000 ppm by weight or more of metals; these metals are mainly vanadium and nickel, together with variable proportions of iron and other metals.

The deactivation of hydrotreatment catalysts is illustrated by U.S. Pat. No. 4,017,380 having for object to cope with this difficulty by using a cyclic process; a catalytic hydrodesulfuration (HDS) unit (I) precedes a visbreaking (II) unit containing a deactivated HDS catalyst; as soon as the active hydrodesulfuration catalyst (I) has deactivated, the operations are reversed after replacement of catalyst (II) by fresh catalyst: the charge then passes over the active HDS catalyst (II) under HDS conditions, then over the inactive catalyst (I) under visbreaking conditions.

There is thus place on the market for a really continuous process wherein the hydrotreatment catalyst may be used over several weeks or several months without deactivation.

SUMMARY OF THE INVENTION

The process of the invention comprises the essential following steps:
a—A first step of subjecting the heavy hydrocarbon charge, admixed with hydrogen, to hydrovisbreaking conditions.
b—A second step of passing the product from step (a), admixed with hydrogen, over a catalyst containing alumina and at least one metal or compound of metal from at least one of groups V, VI and VIII (iron group), said catalyst being characterized in that it consists of a plurality of juxtaposed conglomerates, each of which is formed of a plurality of acicular plates, the plates of each conglomerate being generally oriented radially with respect to one another and with respect to the conglomerate center.
c—A third step of subjecting the product from step (b) to a treatment with hydrogen, in contact with a catalyst containing alumina and at least one metal or compound of a metal selected from the group of molybdenum, tungsten, nickel, cobalt and iron.

DETAILED DISCUSSION

According to a preferred embodiment, step (c) is conducted in two successive stages:

A first stage in contact with a catalyst ($C_1$) containing alumina, at least one molybdenum and/or tungsten compound and at least one nickel and/or cobalt compound, the ratio by weight of the metals:

$(Ni+Co)/(W+Mo)$ being from 0.8:1 to 3:1 and preferably from 1:1 to 2:1, one of the metals at the numerator or at the denominator being optionally omitted:

A second stage in contact with a catalyst ($C_2$) containing alumina, at least one molybdenum and/or tungsten compound and at least one nickel and/or cobalt compound, the ratio by weight of the metals:

$(Ni+Co)/(W+Mo)$ being from 0.2:1 to 0.5:1, preferably from 0.25:1 0.35:1, one of the metals at the numerator or at the denominator being optionally omitted.

The ratio by weight of catalyst $C_2$ to catalyst $C_1$ is preferably from 1:1 to 9:1.

The catalyst of step (b) has been described in allowed U.S. patent application Ser. No. 505,557 filed June 17, 1983 whose disclosure is herein incorporated by way of reference. The essential information is summarized below:

As a general rule, a large proportion, mostly at least 50%, of the acicular plates have a size along their longer axis from 0.05 to 5 micrometers and preferably from 0.1 to 2 micrometers, a ratio of said size to their average width from 2 to 20 and preferably from 5 to 15, a ratio of said size to their average thickness from 1 to 5000 and preferably from 10 to 200. A large proportion, often at least 50% of the acicular plates conglomerates form a collection of pseudo-spherical particles of an average size from 1 to 20 micrometers, preferably from 2 to 10 micrometers. Such a structure is very adequately represented, for example, by pictures of a heap of thorny chesnut-hulls or a heap of sea-urchins.

Figure 1:
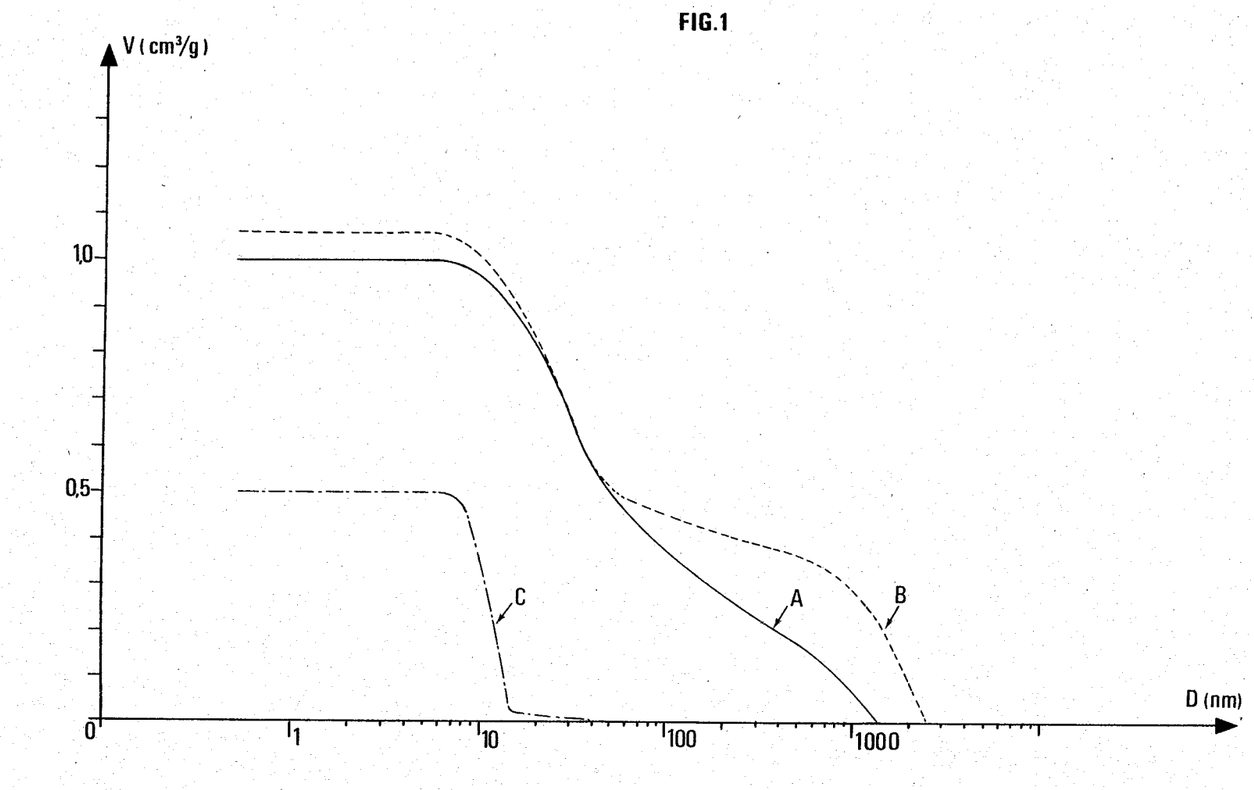
FIG. 1 is a plot of the pore distribution of a catalyst (A) suitable for use in step (B) of the process of the invention, and of a bimodal (B) or monomodal (C) prior art catalyst.
Figure 2:
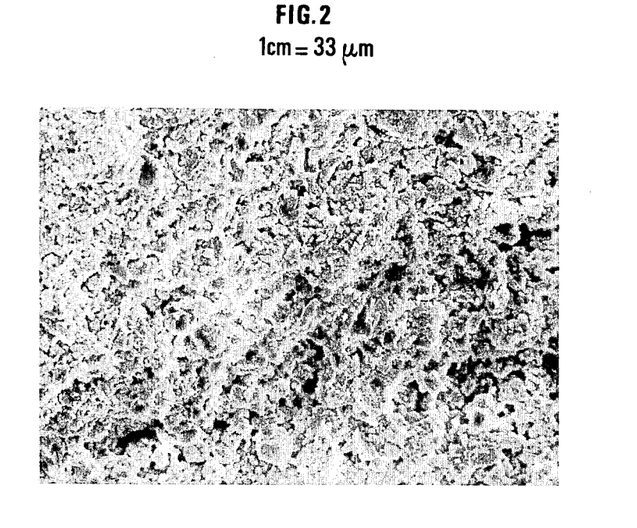
FIGS. 2-6 show electron micrographs of catalyst A, at various magnifications.
Figure 3:
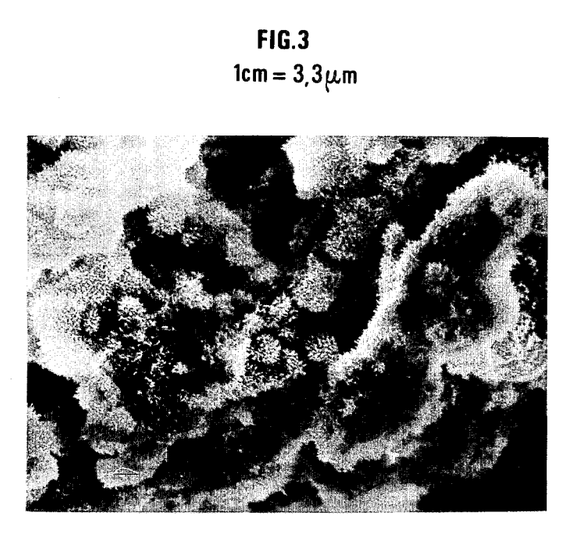
Figure 4:
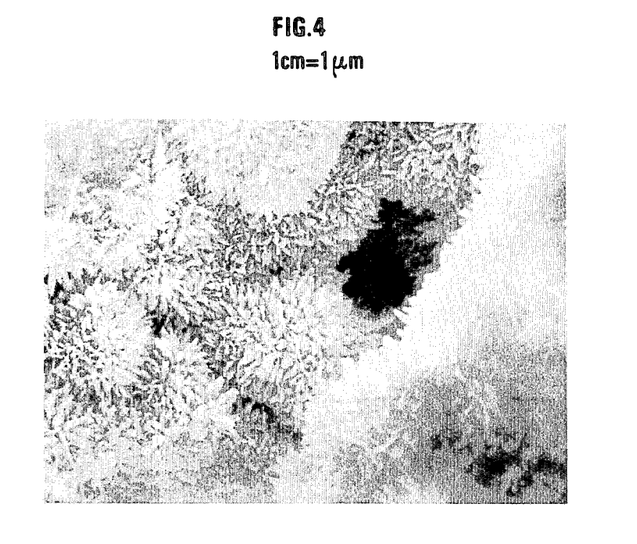
Figure 5:
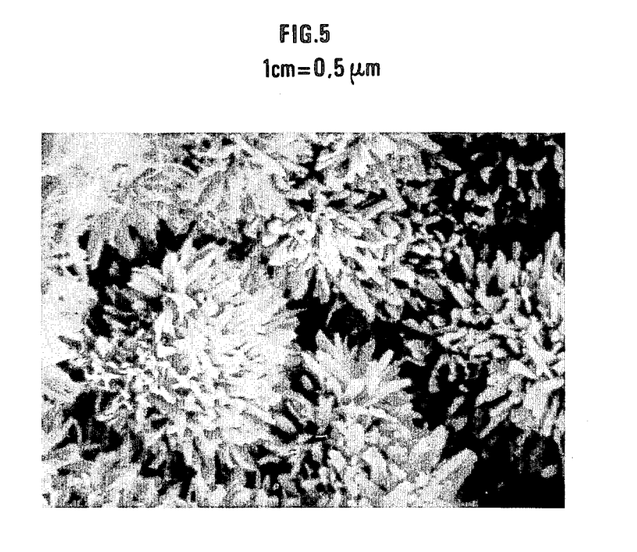

FIG. 1 comparatively shows the pore distribution curve of a catalyst (A) as used in step (b) of the invention and those corresponding to monomodal (C) or bimodal (B) catalysts of the prior art.

The catalyst use in the process of the invention has preferably the following pore distribution:
total pore volume: 0.7 to 2.0 cc/g, preferably 0.90 to 1.30 cc/g.
% of the total volume in pores of average diameter smaller than 10 nanometers: 0-10.
% of the total pore volume in pores of average diameter from 10 to 100 nanometers: 40-90.

% of the total pore volume in pores of average diameter from 100 to 500 nanometers: 5–60.

% of the total pore volume in pores of average diameter from 500 to 1000 nanometers: 5–50.

% of the total pore volume in pores of average diameter larger than 1000 nanometers: 5–20.

The specific surface of this catalyst is from 50 to 250 $m^2/g$ and more preferably from 120 to 180 $m^2/g$.

The scanning electron microscopy technique is an unambiguous means for characterizing by microphotographs a catalyst having the above structure. FIGS. 2 to 5 show four microphotographs with enlargements of 300 times, 3000 times, 10,000 times and 20,000 times respectively, of a catalyst according to the invention (catalyst A), well illustrating the particular structure similar to juxtaposed sea-urchins as mentioned above.

Figure 6:
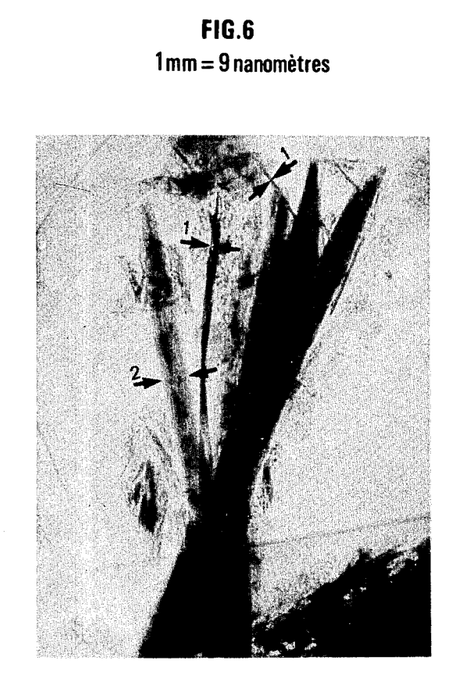
Figure 7:
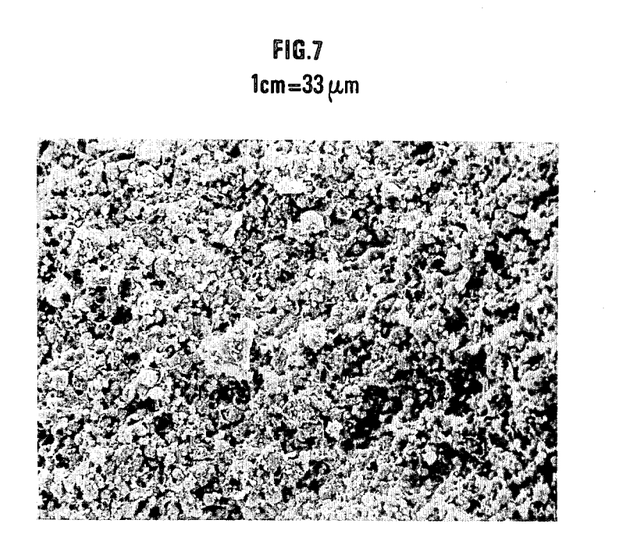
FIGS. 7-10 show electron micrographs of catalyst B.
Figure 8:
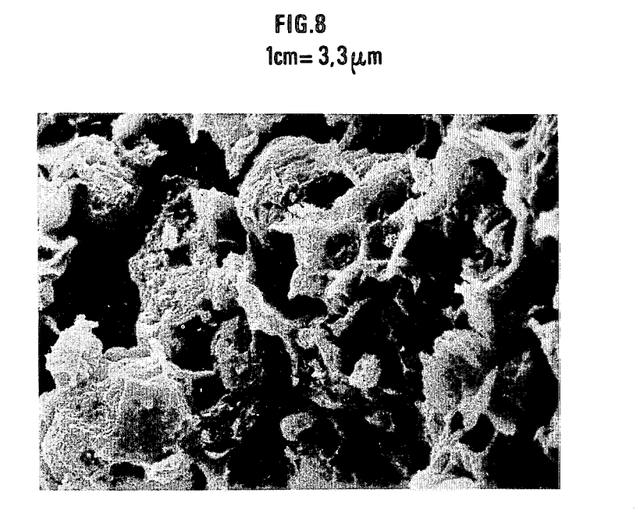
Figure 9:
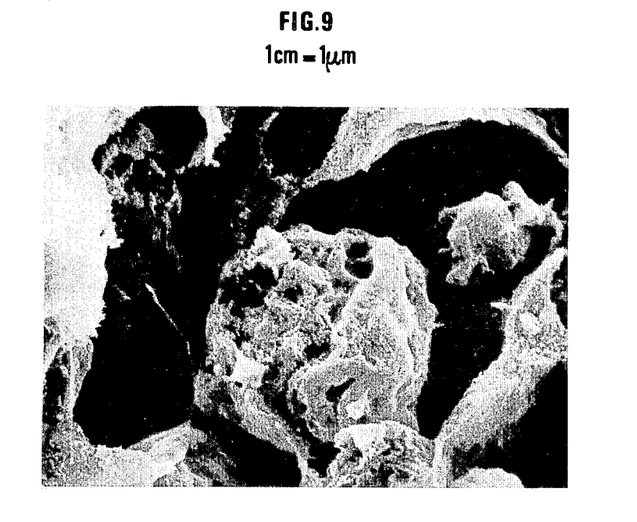
Figure 10:
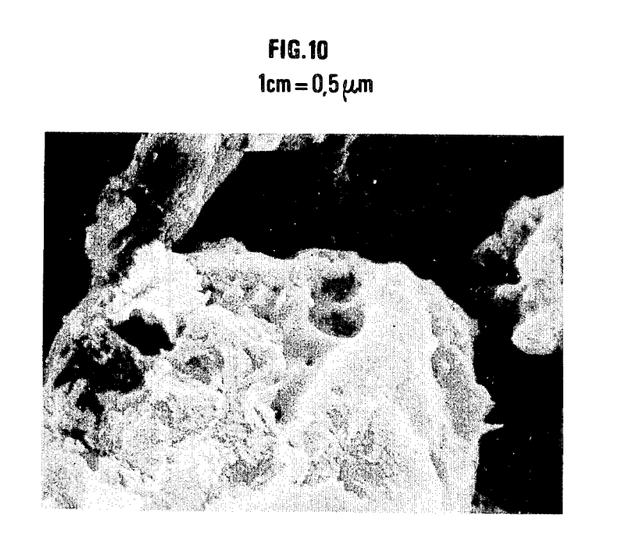

FIG. 6 shows a microphotograph, with a nominal enlargement of 110,000 times, of an acicular plates beam of catalyst A, illustrating the typical shape of these plates. The intervals between the opposite arrows with reference number 1 identify the edgewise plates trace and are an approximate measure of the thickness of these plates. The interval between the opposite arrows indicated with reference 2 identifies a plate parallel to the plane of the photograph and is a measure of the average width of said plate. In FIG. 6, the scale is 9 nanometers per millimeter and the dark-colored portions correspond to the catalytic substance.

On the contrary, FIGS. 7 to 10 show four microphotographs taken with the same respective enlargements as in FIGS. 2 to 5 and with the same apparatus, of a catalyst sample (catalyst B) prepared by using bimodal alumina balls obtained by the process patented in France under No. 2 449 474: these photographs are a good illustration of the description given in the latter patent, i.e. that macroporosity results from interparticle voids existing between spheroidal microporous particles whose granulometry distribution and piling compactness determine the macroporous volume and the macropores size. On the photographs of FIGS. 2 to 5 and 7 to 10 the dark-colored areas correspond to void spaces in the catalyst structures, i.e. to the macroporosity, whereas the pale portions correspond to the catalytic substance. The distribution of the macropores diameters of catalyst B may be measured on the photographs and effectively corresponds to that measured by means of a mercury-pump porosimeter, as shown in FIG. 1. The comparison of the microphotographs makes apparent that the microporous spheroidal particles of catalyst B do not have the sea-urchin structure as obtained for catalyst A used in the step (a) of the invention.

The catalysts used in step (b) of the present process have an excellent resistance to clogging of the pore openings; this result may be explained as follows:

the pores of these catalysts, formed in major part of void spaces located between the radially oriented acicular plates, are "wedge" pores, hence, of continuously varying diameter.

these radially oriented pores are not necessarily linear.

these radially oriented pores are not channels giving access to micropores of diameters lower than 10 nanometers, as in the known catalysts, but they form themselves a mesoporosity resulting in a catalytically active surface.

A catalyst for use in step (b) of the invention may be prepared according to the following method, without limiting the invention to this particular method of preparation:

Conglomerates of alumina particles of a size from about 0.1 to 10 millimeters or of alumina powder particles of a size from about 20 to 100 micrometers, having themselves the above-mentioned sea-urchins structure and having substantially the same characteristics as those of the catalyst of the invention, particularly as concerns the shape and the size of the plates and conglomerates, the specific surface and the porosity, are used as carrier.

By any known method, there is deposited on these conglomerates one or more catalytic metals, i.e. at least one metal or compound of a metal pertaining at least to one of groups V, VI and VIII (iron group) of the periodic classification, more particularly one or more of the following metals: molybdenum, tungsten, iron, vanadium, cobalt and nickel. Preferred associations thereof are molybdenum+cobalt, molybdenum+nickel, vanadium+nickel, tungsten+nickel.

The above-mentioned metals are mostly introduced as precursors such as oxides, acids, salts, organic complexes, in such amounts that the catalyst contains from 0.5 to 40% and preferably from 1 to 20% by weight of these metals, as oxides. These precursors are well known and hence need not be listed here. The final step comprises an optional drying and a thermal treatment at a temperature from 400° to 800° C.

The alumina conglomerates may be manufactured from alumina, optionally containing other elements, for example sodium, rare earths or silica. Alumina containing from 100 to 1000 ppm by weight of silica is preferred. The operation is preferably conducted as follows:

(a) Aluminum conglomerates are treated in an aqueous medium formed of a mixture of at least one acid able to dissolve at least a portion of the alumina conglomerates and at least one compound supplying an anion capable to combine with the dissolved aluminum ions, this latter compound being a chemical compound different from the above-mentioned acid.

The resultant conglomerates are simultaneously or subsequently subjected to a treatment at a temperature from about 80° C. to about 250° C. for a period from about a few minutes to about 36 hours.

(c) The conglomerates are optionally dried and are subjected to thermal activation at a temperature from about 500° C. to about 1100° C.

The active alumina conglomerates according to the invention may be prepared from an active alumina powder of insufficiently crystallized and/or amorphous structure, for example one obtained according to the process disclosed in the French Pat. No. 1,438,497.

The active alumina is generally obtained by quick dehydration of aluminum hydroxides such a bayerite, hydrargillite or gibbsite, nordstrandite or aluminum oxyhydroxides such as boehmite and diaspore.

The active alumina agglomeration is achieved by methods well known in the art and particularly by pelletizing, extrusion, shaping as balls in a revolving bowl granulator, etc.

Preferably this agglomeration is effected, as it is well known in the art, with addition of porogenous agents to the mixture to be agglomerated. The porogenous agents are mainly wood dust, charcoal, cellulose, starch, naphthalene, and more generally any organic compound liable to be removed by calcination.

The conglomerates are then optionally subjected to maturation, drying and/or calcination.

The resultant active alumina conglomerates have the following characteristics: their loss on heating, measured by calcination at 1000° C., is from about 1 to about 15%, their specific surface is from about 100 to about 350 m²/g and their total pore volume is from about 0.45 to about 1.5 cc/g.

The active alumina conglomerates are then treated in an aqueous medium consisting of a mixture of at least one acid for dissolving at least a portion of the alumina conglomerates and at least one compound supplying an anion capable to combine with the dissolved aluminum ions.

According to the invention, an acid able to dissolve at least a portion of the alumina conglomerates is any acid which, when contacted with the active alumina conglomerates as above defined, dissolves at least a portion of the aluminum ions. The acid must dissolve at least 0.5% and at most 15% by weight of the alumina of the conglomerates. Its concentration in the aqueous treatment medium must be lower than 20% by weight and preferably from 1% to 15%.

Strong acids such as nitric acid, hydrochloric acid, perchloric acid, sulfuric acid or weak acids at a concentration sufficient to provide a pH lower than about 4, are preferably used.

According to the invention, a compound supplying an anion able to combine with dissolved aluminum ions, is any compound able to liberate in solution an anion A(−n) liable to form with cations Al(3+), products having an atomic ratio n(A/Al) lower than or equal to 3. An illustration of particular compounds is given by basic salts of general formula $Al_2(OH)_X A_y$ wherein $0 < X < 6$; $ny < 6$; n representing the number of charges of anion A.

The concentration of this compound in the aqueous treatment medium must be lower than 50% by weight and preferably from 3% to 30%.

Preferred compounds are those able to liberate in solution anions selected from the group consisting of the nitrate, chloride, sulfate, perchlorate, chloroacetate, dichloroacetate, trichloroacetate, bromoacetate, and dibromoacetate anions and the anions of the general formula:

wherein R is a radical selected from the group comprising H, $CH_3$, $C_2H_5$, $CH_3CH_2CH_2$, $(CH_3)_2CH$.

The compounds able to liberate in solution the anion A(−n) may effect this liberation, either directly, for example by dissociation or indirectly, for example by hydrolysis. The compounds may in particular be selected from the group comprising: inorganic or organic acids, anhydrides, organic or inorganic salts, esters. Among the inorganic salts there can be mentioned the alkali or alkaline-earth metals salts soluble in aqueous medium such as the sodium, potassium, magnesium, calcium, and ammonium salts, the aluminum salts and the rare earth metal salts.

This treatment may be effected either by dry impregnation of the conglomerates or by immersion of the conglomerates in an aqueous solution of the above-mentioned mixture of acid with the compound supplying the desired anion. Dry impregnation means contacting the alumina conglomerates with a volume of solution smaller than or equal to the total pore volume of the conglomerates.

According to a more preferred embodiment of the invention, mixtures of nitric and acetic acids or of nitric and formic acids are used as aqueous medium.

The resultant conglomerates are simultaneously or successively subjected to a treatment at a temperature from about 80° to about 250° C. for about 5 minutes to about 36 hours.

This hydrothermal treatment does not result in any alumina loss.

The operation is preferably conducted at a temperature from 120° to 220° C., for 15 minutes to 18 hours.

This treatment constitutes a hydrothermal treatment of the active alumina conglomerates which results in conversion of at least a portion thereof to boehmite. This hydrothermal treatment may be effected either under saturating vapor pressure or under a pressure amounting to at least 70% of the saturating vapor pressure corresponding to the treatment temperature.

Without limiting the present invention to a particular theory it may be assumed that the association of an acid providing for the dissolution of at least a portion of the alumina with an anion providing for the formation of the above-described products during the hydrothermal treatment, results in the formation of a particular boehmite, a precursor of the acicular plates of the invention, whose growth proceeds radially from crystallization germs.

Moreover the concentration of acid and of compound in the treatment mixture and the hydrothermal treatment conditions are such that no alumina loss occurs. The porosity increase after the treatment is hence due to the expansion of the conglomerates during the treatment and not to an alumina loss.

The resultant conglomerates are then optionally dried at a temperature generally from about 100° to 200° C. for a sufficient time to remove chemically uncombined water. The conglomerates are then subjected to thermal activation at a temperature from about 500° C. to about 1100° C. for a period from about 15 minutes to 24 hours.

The activation operations may be performed in several steps. Preferably the activation is performed at a temperature from about 550° C. to 950° C.

The resultant active alumina conglomerates have the following characteristics:

A packed filling density from about 0.36 to 0.75 g/cm³.

A total pore volume (T P V) from 0.7 to about 2.0 cm³/g.

A distribution of the pore volumes in accordance with the pore sizes conforming to the above mentioned values for the catalyst used in the first step of the process of the invention, with the adjustment taking into account the weight increase due to the metals deposition.

A specific surface measured by the B.E.T method from about 80 to about 250 m²/g.

A mechanical strength from 2 to about 20 kg, measured by the grain-to-grain crushing method.

The above-mentioned process for manufacturing alumina conglomerates results in particular in a completely unexpected modification in the distribution of the pore volumes in accordance with the pores sizes of the untreated conglomerates. It makes possible in particular to increase the proportion of pores of a size from 10 to 100 nanometers, to reduce the proportion of pores of a size lower than 10 nanometers and to decrease the proportion of pores of a size greater than 500 nanometers while not substantially modifying the proportion of the pores of a size from 100 to 500 nanometers.

The resultant alumina conglomerates are optionally thermally stabilized by rare earth metals, silica or alkaline-earth metals.

Step (c) of the process, as specified above, is preferably conducted with the use of two successive catalyst beds, referred to as ($C_1$) and ($C_2$).

The carrier of catalyst ($C_1$) preferably consists of low-acidity alumina, i.e. having a neutralization heat by ammonia adsorption at 320° C. lower than 40 joules (and preferably lower than 30 joules) per gram of alumina under an ammonia pressure of 0.4 bars. This alumina carrier has a surface from 50 to 300 m$^2$/g and preferably from 40 to 150 m$^2$/g and a pore volume generally from 0.4 to 1.3 cm$^3$/g. An example of a carrier of this type is alumina subjected to autoclaving under steam pressure.

Catalyst ($C_2$), used in the second catalyst bed, will be preferably incorporated with a carrier of greater acidity than catalyst carrier ($C_1$): its acidity, determined as above by ammonia adsorption, will be preferably higher than 30 joules/g. Its surface is preferably from 150 to 350 m$^2$/g and its pore volume preferably from 0.4 to 1 cm$^3$/g. Examples of carriers having these characteristcs are $\gamma$-alumina (e.g. boehmite) or $\eta$-alumina (e.g. bayerite) or carriers of the alumina/magnesia or silica/magnesia type containing about 5 to 10% by weight of magnesia.

The techniques for incorporating active metals (e.g. Mo, W, Ni, Co, Fe) as used in steps (b) and (c) of the process are conventional. These catalysts operate mainly in their sulfurized form; their sulfuration may be effected before the treatment of the charge or may result by contact with the feed in situ.

Step (a) is conducted in the presence of hydrogen in a reaction space either void or containing a relatively inert material, at a temperature from 420° to 500° C., under a pressure from 40 to 200 bars, the residence time of the charge being about 10s to 15 minutes and the hydrogen proportion usually from 300 to 3000 Nm$^3$/m$^3$.

Step (b) is conducted at a temperature generally from 350° to 425° C., under a pressure from 40 to 200 bars, at a hourly flow rate of the liquid charge from 0.2 to 2 m$^3$/m$^3$/h, the hydrogen proportion being usually from 300 to 3000 Nm$^3$/m$^3$.

Step (c) is conducted at 300° to 425° C., under the pressure from 30 to 200 bars, the hydrogen proportion being usually from 500 to 3000 Nm$^3$/m$^3$ and the liquid charge hourly feed rate from 0.2 to 2 m$^3$/m$^3$/h.

Figure 11:
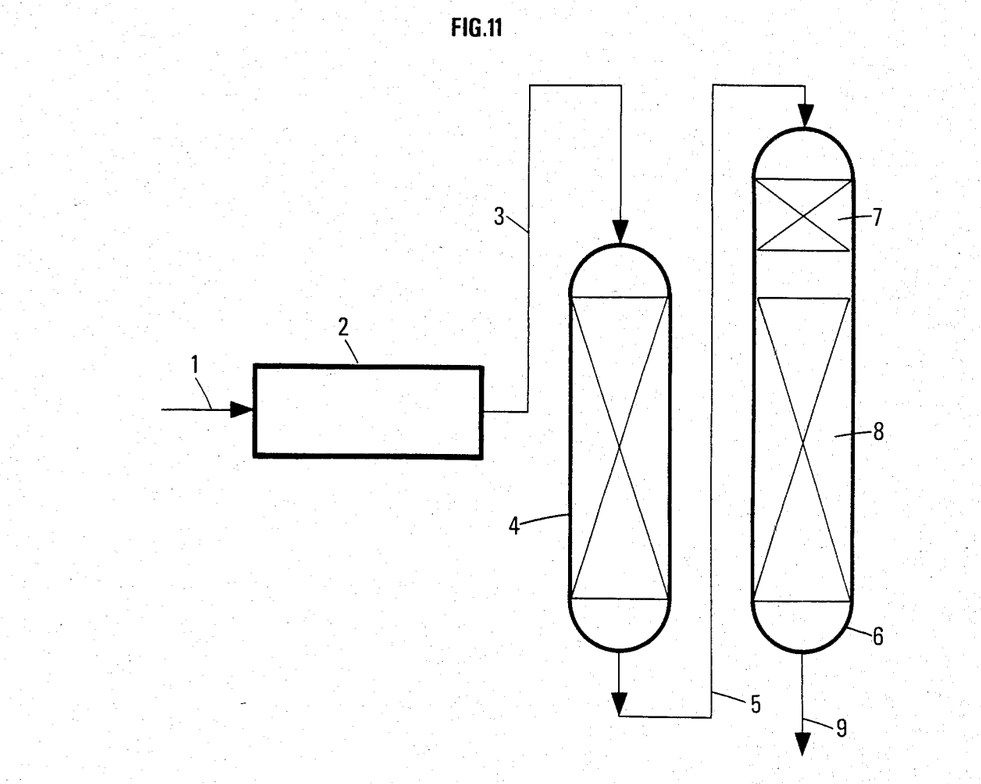
FIG. 11 is a schematic flow diagram for a process according to the invention.

The process of the invention is illustrated by FIG. 11.

A mixture of asphaltic heavy oil with hydrogen is fed through line 1 to a hydrovisbreaking furnace 2, then through line 3 to the catalytic hydrodemetallation reactor 4. The effluent is fed through line 5 to reactor 6 containing a first catalyst bed 7 and a second catalyst bed 8. The final product is withdrawn from line 9.

This arrangement may be subjected to substantial modifications. For example the flow of the reactants may be directed upwardly in one of reactors 4 and 6 or in both of them. The catalysts may be in fixed, moving or expanded bed. Additional hydrogen may be supplied between the reactors. It may be considered, although it is less desirable, to fractionate the effluent products from reactors 2 and/or 4, so as to supply only a portion of these products to the next reactor (4 and/or 6). The final distillation of the products obtained by the process is not shown; it is usually unnecessary or may be effected at the delivery point of the hydrocarbon oil when the latter is supplied, through line 9, to a pipe line, a transport ship or other transportation means.

The charges which may be treated according to the invention are, for example, crude oils, vacuum residues, straight-run residues, oils from bituminous shales or sands, asphalts or oils from coal liquefaction.

The oils have mostly a density higher than $d_4^{15}=0.965$, an API degree lower than 15.1, an asphaltene content (determined with n-heptane) higher than 5% by weight, a content of metals (Ni+V) higher than 200 ppm by weight and a viscosity higher than 50 cSt (50 mm$^2$/s) at 100° C.

EXAMPLE

A Cerro Negro crude oil is treated, whose characteristics are as follows:

$d_4^{15}=1.007$
°API=9
Metals (Ni+V)=500 ppm by weight.
Asphaltenes (extracted with heptane)=10.5% by weight.
Sulfur=3.7% by weight
% distilling above 520° C.=58% by weight
Viscosity=249 cSt (249 mm$^2$/s) at 100° C.

This crude oil, with additional hydrogen, is subjected to hydrovisbreaking in the following conditions:

| | |
|---|---|
| pressure | 150 bars |
| temperature | 460° C. in the furnace |
| | 450° C. in the maturation chamber |
| residence time | 10 s in the furnace |
| | 8 min in the maturation chamber |
| H$_2$ proportion with respect to the charge | 800 Nm$^3$/m$^3$. |

The effluent is passed, with additional hydrogen, over a catalyst (A) containing, by weight:

| | |
|---|---|
| Al$_2$O$_3$ as acicular plates conglomerates | 91.5% |
| MoO$_3$ as acicular plates conglomerates | 7% |
| NiO as acicular plates conglomerates | 1.5% |

FIGS. 2 to 5 show microphotographs of catalyst A taken with a scanning electron microscope of trade mark JEOL, Model JSP 35 CF, with respective enlargements of 300, 3000, 10,000 and 20,000. The scales indicated on each photograph make it possible to measure the sizes of observable details. The dark parts correspond to the porosity while the pale portions correspond to the catalytic substance. It is apparent that catalyst A has effectively a structure of the "sea-urchins" type corresponding to a juxtaposition of conglomerates having in majority an average size of 3.5 micrometers, each conglomerate being formed of elongate acicular plates, generally radially assembled with respect to the center of the conglomerates. The sizes of the acicular plates can be measured in particular on FIG. 6, which is a microphotograph taken with a nominal enlargement of 110,000 by a scanning transmission electron microscope (S.T.E.M. VG HB5). The dark areas correspond here to the catalytic substance. The scale of this microphotograph is 9 nanometers per millimeter. The intervals defined by the opposite arrows with references 1 and 2 respectively correspond to the traces of the acicular plates positioned perpendicular and parallel to the plane of the picture. The intervals 1 and 2 thus give an approximate value of the thickness of the plates and the interval 2 a measurement of the width of the plate, i.e. respectively 2 to 4 nanometers and 60 nanometers, the plates of FIG. 6 have a length of about 0.5 to 1 micrometer, which is in accordance with the lengths which can be measured on FIG. 5 where these plates are shown in the conglomerates. The ratio of the average length to the average width is hence from about 8 to 16 and the ratio of the average length to the average thickness is from about 120 to 480.

FIG. 1 shows in particular the aggregate pore distribution curve of catalyst A. The diameter of the pores (D), expressed in nanometers, is plotted in abcissae and the aggregate pore volume (V), expressed in cm$^3$/g, in ordinates. It is observed that the distribution conforms with the definition of the invention and particularly that it does not comprise a well apparent intermediate inflexion point.

The passage of the charge and hydrogen over presulfurized catalyst (A) is effected in the following conditions:

| | |
|---|---|
| temperature | 380 to 410° C. |
| pressure | 150 bars |
| hourly feed rate of the liquid charge | 0.5 m$^3$/m$^3$/h |
| H$_2$ amount | 800 Nm$^3$/m$^3$ of charge |

The effluent is fed, with hydrogen, to a reactor comprising two successive catalyst beds:

The first bed amounts to 20% by weight of the total of the two catalysts; it consists of nickel and molybdenum in a ratio by weight: Ni/Mo=1.68

The carrier of this catalyst is alumina of low acidity, having a neutralization heat by NH$_3$ adsorption of 20 joules/g, a specific surface of 140 m$^2$/g and a pore volume of 0.48 cm$^3$/g. This catalyst is sold on the trade by Sociètè Francaise PROCATALYSE under reference LD 145.

The second bed amounts to 80% by weight of the total catalysts; it consists of cobalt and molybdenum in a ratio by weight: Co/Mo=0.25.

Its carrier is of the γ alumina type, having a specific surface of 210 m$^2$/g, its pore volume being 0.52 cm$^3$/g; this carrier has a neutralization heat by NH$_3$ adsorption of 40 joules/g.

This catalyst is sold on the trade by Sociètè Francaise PROCATALYSE under reference HR 306.

The ratio by weight of the catalyst of the second bed to that of the first bed is hence 4.

The temperature in the reactor is from 370° to 400° C. and the pressure 140 bars. The hourly feed rate of liquid charge is 0.5 m$^3$m$^3$/h, the hydrogen proportion with respect to the charge is 1200 Nm$^3$/m$^3$.

The final liquid product obtained after these operations has the following characteristics:
d$_4^{15}$=0.880
°APR=29.3
Content of metals (Ni+V)<5 ppm by weight
Content of asphaltenes (extracted with heptane): 1.0% by weight.
Sulfur content: 0.2% b.w.
% distilling above 520° C.=12% by weight.

Viscosity:
2.5 cSt (2.5 mm$^2$/s) at 100° C.
30 cSt (30 mm$^2$/s) at 20° C.
Yield by weight of liquid effluent with respect to the original crude oil: 94%.

The process has thus resulted in the conversion of a heavy viscous, non-transportable crude oil of high impurity content, to a stable, easily transportable, synthetic crude oil of low impurity content. The life time of the catalysts is remarkable in view of the charge. As a matter of fact, the retention capacity of these catalysts is far above 100 g of metals for 100 g of fresh catalyst; the life time of this catalytic system is in direct relation with the space velocity selected for the treatment.

What is claimed as the invention is:

1. A process for converting a charge of an asphaltene-containing heavy oil fraction to a lighter oil, comprising the steps of:
    (a) subjecting the charge, admixed with hydrogen, to hydrovisbreaking, at a pressure of 40-200 bar, a temperature of 420°-500° C., a ratio of the normalized volume of hydrogen to the volume of charge of 300-3000, and a residence time of 10 seconds to 15 minutes;
    (b) passing the effluent from step (a), admixed with hydrogen, under hydrodemetallation conditions, over a catalyst containing alumina and at least one metal from at least one of groups V, VI and VIII (iron group), said catalyst consisting of juxtaposed conglomerates each formed of a plurality of acicular plates, the plates of each conglomerate being generally radially oriented with respect to one another and with respect to the center of the conglomerate, wherein said catalyst contains a major proportion of wedge-shaped mesopores, and has an improved resistance to pore mouth plugging compared with bimodal or monomodal porous catalysts; and
    (c) treating the effluent from step (b) with hydrogen, in contact with a catalyst containing alumina, and at least one metal or metal compound selected from molybdenum, tungsten, nickel, cobalt, iron or compounds thereof, under hydrodesulfuration conditions.

2. A process according to claim 1, wherein step (c) is conducted first in contact with a catalyst C$_1$ then in contact with a catalyst C$_2$, each of these catalysts containing alumina, at least one molybdenum and/or tungsten compound and at least one nickel and/or cobalt compound, the ratio by weight of the metals (Ni+Co)/(W+Mo).

3. A process according to claim 2, wherein the carrier of catalyst C$_1$ is an alumina of low acidity, having a neutralization heat, by ammonia adsorption at 320° C., lower than 40 joules per gram of alumina, at an ammonia pressure of 0.4 bar.

4. A process according to claim 3, wherein the catalyst has a specific surface of 50-300 m$^2$/g, and a pore volume of 0.4-1.3 cm$^3$/g.

5. A process according to claim 2, wherein the carrier of catalyst C$_2$ has a neutralization heat, by ammonia adsorption at 320° C., higher than 30 joules/g, a specific surface of 150-350 m$^2$/g, and a pore volume of 0.4-1 cm$^3$/g.

6. A process according to claim 1, wherein the catalyst conglomerates of step (b) have an average size of about 1 to 20 micrometers, the acicular plates having an average length of about 0.05 to 5 micrometers, a ratio of their average length to their average width of about 2 to 20, and a ratio of their average length to their average thickness of about 1 to 5000.

7. A process according to claim 6, wherein the catalyst of step (b) has a specific surface from 50 to 250 m²/g, a total pore volume from 0.7 to 2.0 cm³/g and a pore distribution as follows:
- % of the total pore volume in pores of average diameter smaller than 10 nanometers: 0–10%;
- % of the total pore volume in pores of average diameter from 10 to 100 nanometers: 40–90%;
- % of the total pore volume in pores of average diameter from 100 to 500 nanometers: 5–60%;
- % of the total pore volume in pores of average diameter from 500 to 1000 nanometers: 5–50%;
- % of the total pore volume in pores of average diameter larger than 1000 nanometers: 5–20%.

8. A process according to claim 1 wherein the catalyst carrier of step (b) is alumina containing from 100 to 1000 ppm of silica.

9. A process according to claim 1, wherein the catalyst of step (b) contains from 0.5 to 40% by weight of at least one metal from at least one of groups V, VI and VIII (iron group) expressed as oxides.

10. A process according to claim 1, wherein said asphaltene-containing charge is a crude oil, a vacuum residue, a straight-run residue, an oil recovered from bituminous shales or sands an asphalt fraction, or an oil from coal liquefaction.

11. A process according to claim 10, wherein said oil has a density higher than $d_4^{15}=0.965$, an API degree lower than 15.1, an asphaltenes content, determined with n-heptane, higher than 5% by weight, a metals content, measured as $Ni+V$, higher than 200 ppm by weight, and a viscosity higher than 50 centistokes at 100° C.

12. A process according to claim 10, wherein said charge comprises more than 50% of constituents having a normal boiling point higher than 520° C.

13. A process according to claim 1, wherein step (b) is effected at a temperature of about 350°–425° C., a pressure of 40–200 bar, a space velocity of 0.2–2, and a ratio of the normalized volume of hydrogen to the volume of charge of 300–3000.

14. A process according to claim 1, wherein step (c) is effected at a temperature of 300°–425° C., a pressure of 30–200 bar, a space velocity of 0.2–2, and a ratio of the normalized volume of hydrogen to the volume of charge of 500–300.

* * * * *